United States Patent [19]

Bose

[11] Patent Number: 4,477,809
[45] Date of Patent: Oct. 16, 1984

[54] METHOD FOR RANDOM-ACCESS RADIO-FREQUENCY DATA COMMUNICATIONS

[75] Inventor: Sanjay K. Bose, Kanpur, India

[73] Assignee: General Electric Company, Schenectady, N.Y.

[21] Appl. No.: 389,533

[22] Filed: Jun. 18, 1982

[51] Int. Cl.³ .................. H04B 3/60; H04B 17/00; H04Q 7/00
[52] U.S. Cl. ................. 340/825.54; 455/54; 340/825.5; 340/825.07; 340/825.36
[58] Field of Search ............ 340/825.54, 825.07, 340/825.72, 825.5, 825.44, 825.52, 825.36; 364/138; 455/54, 53, 56, 33

[56] References Cited

U.S. PATENT DOCUMENTS

| | | | |
|---|---|---|---|
| 3,805,242 | 4/1974 | Matsumoto et al. | 364/138 |
| 3,806,804 | 4/1974 | Mills et al. | 340/825.72 X |
| 3,973,200 | 8/1976 | Akerberg | 340/825.44 |
| 4,369,443 | 1/1983 | Giallanza et al. | 340/825.44 X |
| 4,414,661 | 11/1983 | Karlstrom | 455/33 |
| 4,415,770 | 11/1983 | Kai et al. | 455/56 |

Primary Examiner—Donald J. Yusko
Attorney, Agent, or Firm—Geoffrey H. Krauss; James C. Davis, Jr.; Marvin Snyder

[57] ABSTRACT

A method for random-access data communications to and from a central controller, from and to at least one of a plurality of remote stations, by providing at least one radio-frequency channel having the bandwidth thereof allocated into at least a message channel and an acknowledgment channel. The message channel fractional bandwidth is greater than the acknowledgment channel fractional bandwidth. Status data is transmitted from each of the remote stations to the central controller, with the central controller acknowledging receipt thereof. In the event of a change of status message being received by the central controller, the central controller decides upon a course of action for the system and broadcasts system action messages, each addressed to a particular remote station at which the action is to be carried out. The operational system modes include a link-monitoring mode for checking the radio-frequency link paths between each of the remote stations and the central controller and a polling mode to sequentially request status from each of the remote stations.

34 Claims, 6 Drawing Figures

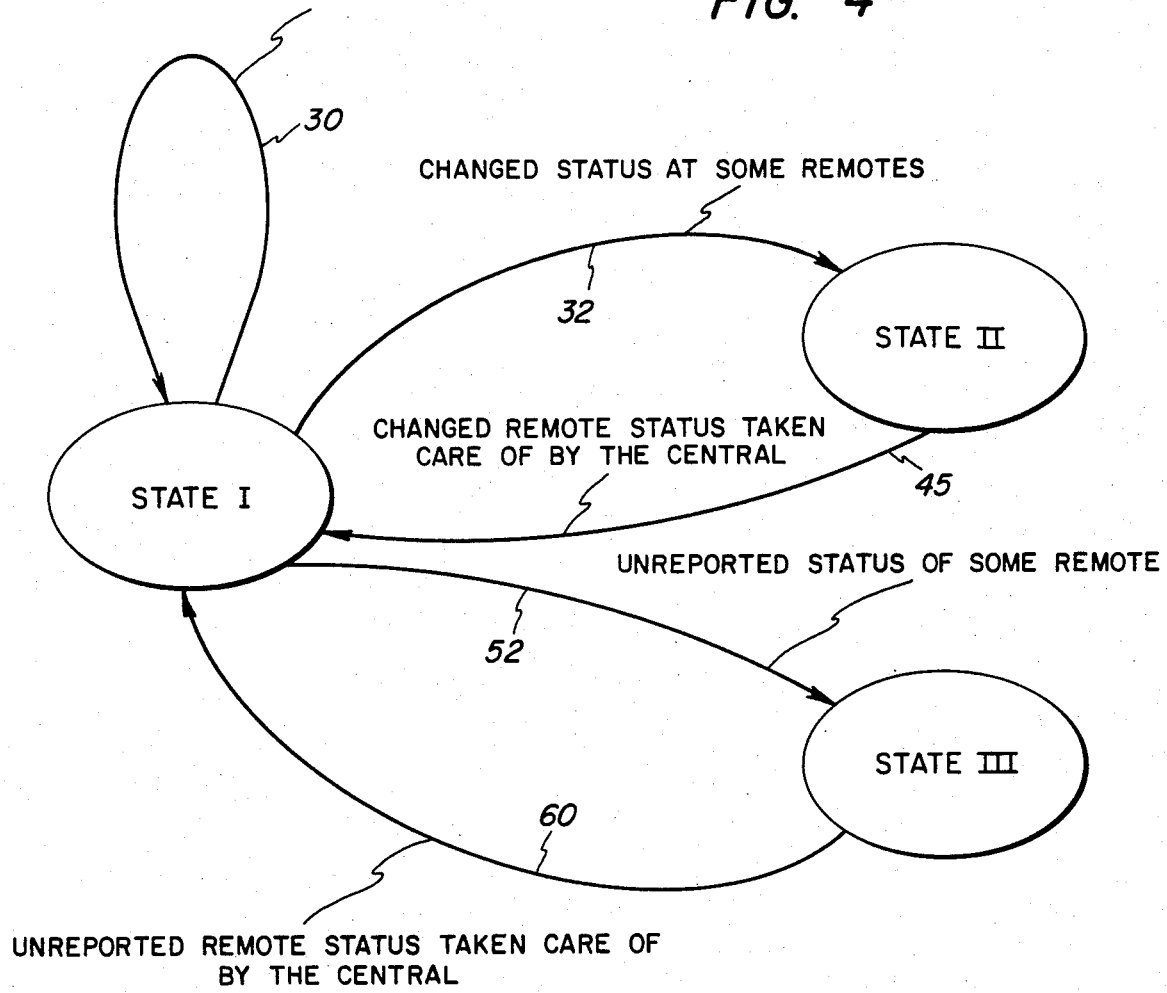

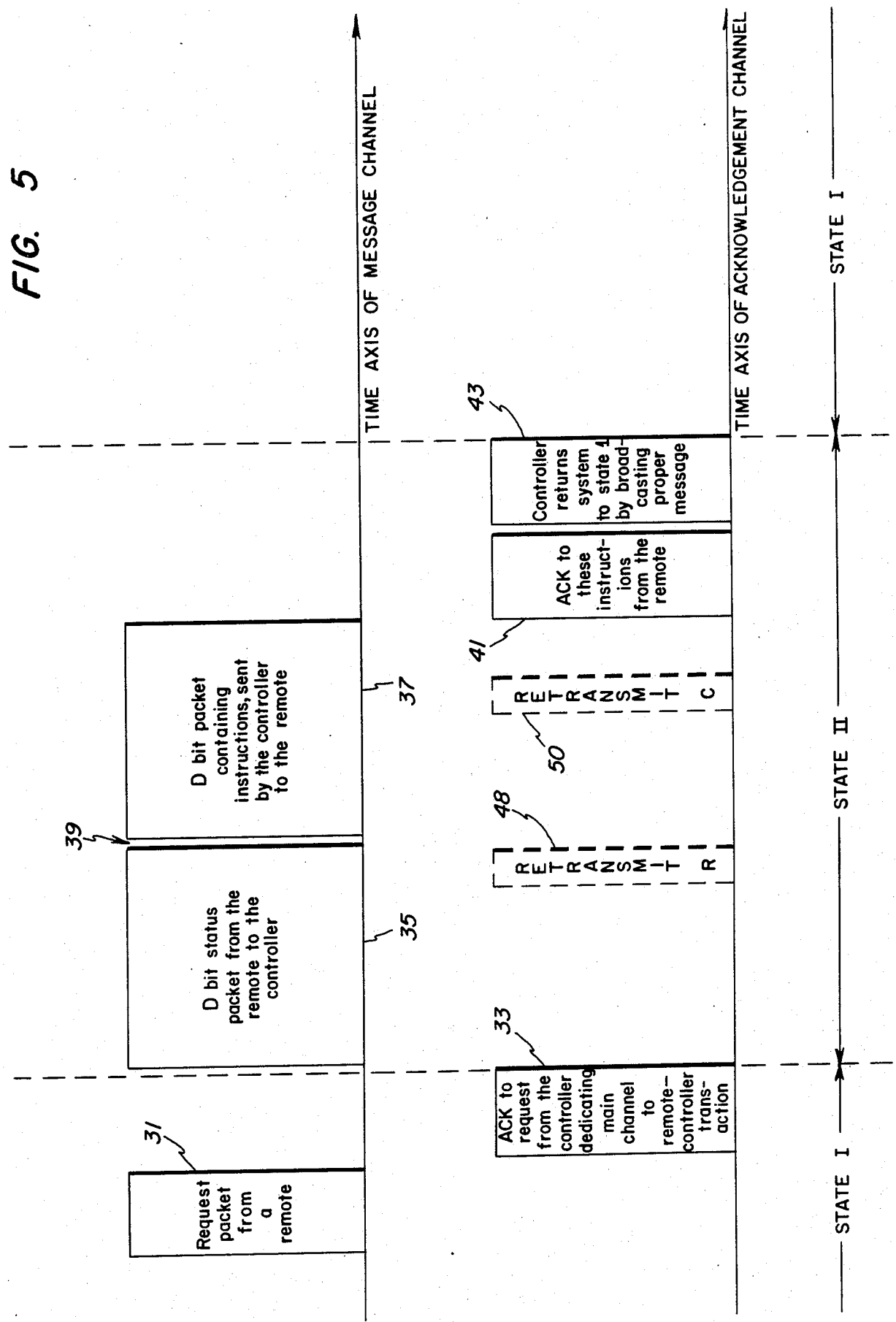

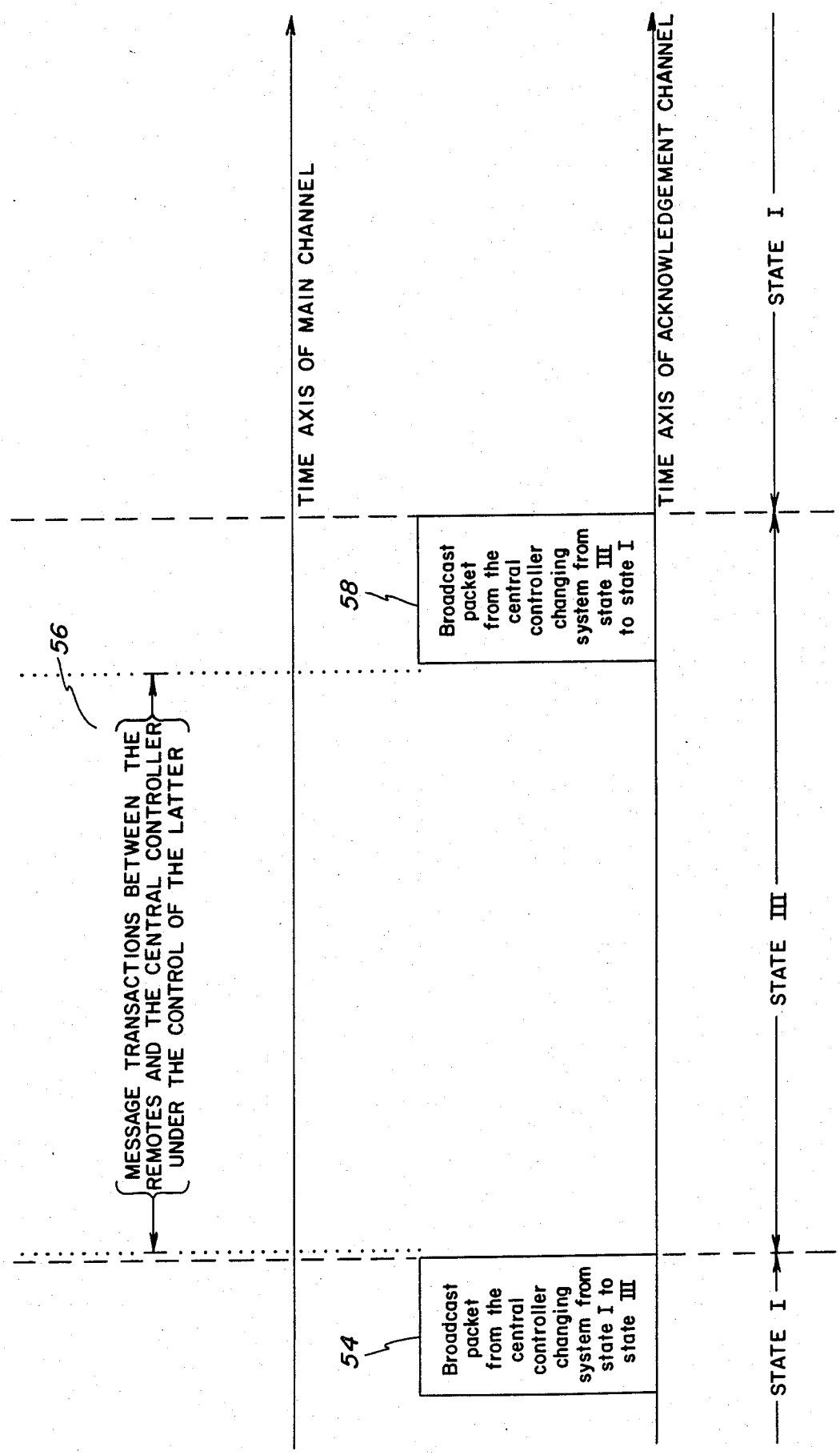

METHOD FOR RANDOM-ACCESS RADIO-FREQUENCY DATA COMMUNICATIONS

BACKGROUND OF THE INVENTION

The present application is directed toward data communications methods and, more particularly, to a novel method for random-access radio-frequency data communications between a central controller and each of a plurality of remote sites.

The problems of providing command and control communications, in a system having a multiplicity of remote sites controlled by a central controller, has been widely investigated. Such a system, for example as utilized as part of a power generation, storage and distribution network, must provide communications for facilitating such system operations as: automatic meter reading, automatic load control, load management, system fault condition control, system reconfiguration and the like. As greater use of system command and control functions is provided, a greater volume of information must be exchanged between the central system controllers and each of a plurality of remote system locations at which system monitoring sensors and system actuators are located. It is therefore highly desirable to provide a communications system having very high information-carrying capability, so that more complex control operations for ever more complex systems can be handled. Because of the known difficulties in providing wire communications between the various remote and central sites, a radio-frequency data communications system of great information-carrying capacity is desirable. Specifically, a radio-frequency communication system allowing random access by each of the plurality of remote sites of the at least one central controller and allowing the central controller to access any one of the plurality of remote sites, is highly desirable.

BRIEF SUMMARY OF THE INVENTION

In accordance with the invention, a method for random-access data communication from and to a central controller, to and from at least one of a plurality of remote stations, includes the steps of: providing at least one radio frequency channel having the bandwidth thereof allocated into at least a message channel and an acknowledgment channel, with the message channel fractional bandwidth being greater than the acknowledgment channel fractional bandwidth; transmitting packets of data between the central controller and at least one remote station on the message channel; and acknowledging receipt of data packets at the central controller by a signal sent on the acknowledgment channel to the at least one remote station. The data packets transmitted from a remote station to the central controller can be: a mini-packet, indicating unchanged status; a request packet, requesting message channel use for a subsequent status packet; or a status packet, advising the central controller of a change in status at the originating remote station. Receipt of a request or status packet causes the central controller to shift systems operation from a normal state to an alert state. If the central controller does not receive an unchanged-status mini-packet from a particular remote station within a certain time interval, the central controller shifts the system to a third state and requests a status report from that remote station.

The method also contemplates the division of the at least one channel bandwidth into message, acknowledgment and request channels, wherein system operation in normal, alert/emergency, polling and link-monitoring modes can be carried out, as in the system wherein the bandwidth is segmented only into main and acknowledgment channels, but at a lesser data rate.

Accordingly, it is an object of the present invention to provide a novel method for random access radio frequency data communication between central controller and a plurality of remote locations.

This and other objects of the present invention will become apparent upon consideration of the following detailed description, when read in conjunction with the drawings.

BRIEF DESCRIPTION OF THE DRAWINGS

FIG. 4 is a state diagram useful in understanding operation of the method of the present invention; and FIGS. 5 and 6 are graphical illustrations of channel usage in accordance with the principles of the present invention.

DETAILED DESCRIPTION OF THE INVENTION

Figure 1:
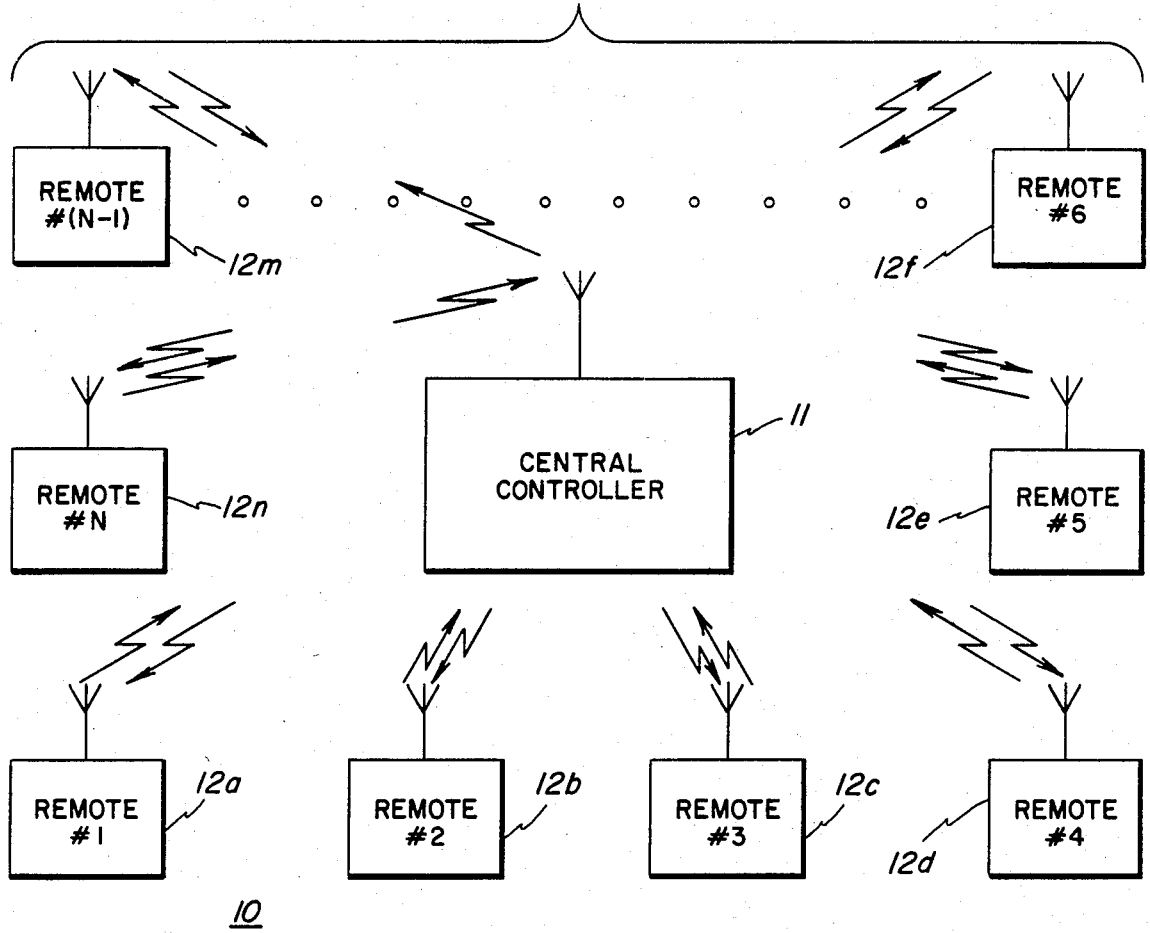
FIG. 1 is a schematic block diagram of a general radio-frequency communications system to which the method of the present invention is applicable.

Referring initially to FIG. 1, the method of the present invention will be described for use with a radio-frequency data communication system 10, utilizing a central controller 11 serving a plurality N of remote control points RCP 12. Each RCP has, in addition to a controlled element (actuator) and/or a data source (sensor), radio-frequency (RF) communications equipment (such as a transceiver and the like, one or more antennas and ancilliary equipment) for bidirectional communications via a common wideband RF channel with RF communications equipment at central controller 11. Digital data is communicated between central controller 11 and RCPs 12 by suitable modulation of the RF carrier, within a single, assigned channel of given bandwidth. In addition, each of the remote RCPs 12a–12n has, in manner known to the art, a slave data processor equipped to handle both the communications protocol chosen and all local command and control functions. The slave processor at each RCP 12 informs central controller 11 of its status and is in turn advised by central controller 11 as to what action, if any, is to be taken. A slave processor can initiate two types of messages for radio communication to the central processor: a low priority message, indicating that the remote location condition is unchanged from a last-reported condition; and a high priority message, indicating a change of status at that remote location. Central controller 11 can initiate three types of messages: a low priority message, polling a remote location slave processor to report (typically due to a lack of recent report from that remote slave processor); a first high priority message, initiated by the central controller and commanding a centrally-requested change; and a second high priority message, controlling the remote RCP to effect a change in response to a change-of-status report from that slave processor.

Figure 2:
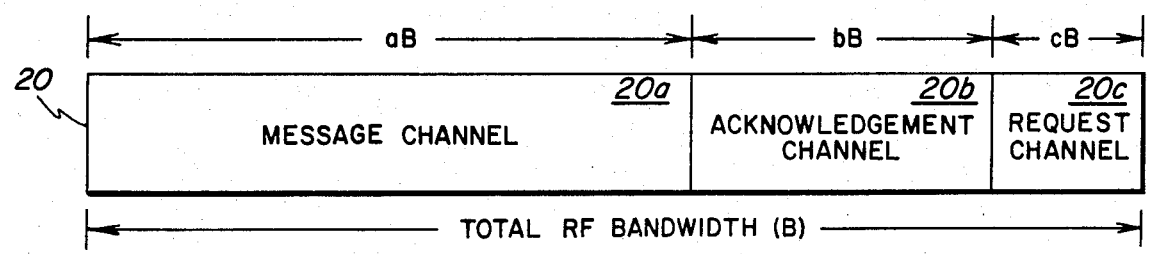
FIG. 2 is a frequency diagram illustrating the partitioning of a single communications channel, in accordance with one method of the present invention.

Referring now to FIG. 2, the single, wideband RF data communications channel 20 may be provided with a total RF bandwidth B. Within bandwidth B are assigned three separate channels: a message channel 20a, occupying a fraction a of the total bandwidth, for a fractional message bandwidth of aB; an acknowledgment channel 20b occupying a fraction b of the total bandwidth, or a fractional bandwidth of bB; and a request channel 20c occupying a fraction c of the total bandwidth, for a fractional bandwidth of cB, where a, b and c are all less than 1 and $a+b+c=1$. Because the data transmission rate is proportional to the available fractional bandwidth, it will be seen that request data must be sent at a slower speed than acknowledgment data, which must be sent at a slower speed than message data.

Because request channel 20c has the lowest fractional bandwidth and can accommodate only relatively low-speed data transmission rates, request channel 20c is utilized only for transmissions from a remote unit 12 to central controller 11. A typical request channel 20c transmission may contain remote location identification, priority information and check bits. Receipt of a request channel message at central controller 11 is automatically considered as requesting permission for that remote unit to engage in a message transaction with the central controller. Upon receipt of a request message at the central controller, an acknowledgment is sent via acknowledgment channel 20b to the requesting remote unit; if a request acknowledgment is not transmitted to the remote unit within a specified time-out period, the remote unit waits a random delay period and retransmits the request on request channel 20c. Thus, request channel 20c is utilized for remote-originated request messages to the central controller, and is typically not utilized for transmissions from central controller 11 to a remote unit 12.

The acknowledgment channel 20b is utilized for carrying transmissions of acknowledgment nature from central controller 11 to a remote unit 12. One type of acknowledgement message is the acknowledgment of the receipt of a remote unit request message received on the remote channel. In addition, the acknowledgment channel is utilized for acknowledgment of correctly-received data transmissions from the remote units.

The message channel 20a is utilized for high-speed data exchange between the remote units and the central controller. The data messages transmitted over the message channel may be data-requests or remote-actuation data transmissions from central controller 11 to at least one of the remote units 12, or may be data transmissions from a remote unit 12 to the central controller, responsive either to a central controller request or a transmission from the remote unit, after having requested access to the central controller (by a request on request channel 20c and acknowledgment thereof on acknowledgment channel 20b). Each remote-unit-originated message is, as previously stated, acknowledged on acknowledgment channel 20b, by central controller 11.

A system thus configured and utilizing bandwidth B for message, acknowledgment and request data transmission channels 20a-20c, can be configured to operate in four modes: a normal mode, an alert/emergency mode, a polling mode and a link-monitoring mode. In the normal mode, the remote units 12 transmit small packets of d bits each, at random on message channel 20a, without first transmitting a request on request channel 20c and, therefore, without receiving a central controller acknowledgment channel 20b transmission. Remote-originated normal-mode transmissions carry identification and parity check bits and are primarily utilized to confirm that the status of the particular remote unit transmitting a normal mode data packet has remained unchanged since the last status report from that remote unit. The normal mode is a low-priority mode and can be preempted by either the central controller (when polling or link-monitoring modes are to be entered) or by another remote unit (when the alert/emergency mode is entered). Further, since the normal mode confirms an unchanged operational state, central controller 11 normally does not send an acknowledgment message on acknowledgment channel 20b. Accordingly, in the normal mode, only message channel 20a is active, with the acknowledgement and request channels 20b and 20c being idle. Further, in the normal mode, message transmission is primarily from remote units to the central controller, although the central controller may utilize the message channel to send low-speed, low-priority data to one or more of the remote units, if required.

The system enters the alert/emergency mode when at least one of the remote units 12 initiates an alert/emergency state by transmitting an alert/emergency request on request channel 20c. This request contains the remote location identification, priority information and parity check bits, all in a single transmission. When received at central controller 11, dependent upon the existing mode and priority information, the system proceeds as follows: if the system is in the normal mode, it enters the alert/emergency mode, wherein the message channel is reserved for data transmission between the particular remote unit 12 signaling the alert/emergency and the central controller; this exchange of transmissions continues until ended by central controller 11 with an acknowledgment signal on acknowledgement channel 20b, thereby returning the system to the normal mode. If the system is already in the alert/emergency mode with on-going transmissions between another remote unit and the central controller, the on-going transmissions are interrupted by the present alert/emergency request only if the present request has a higher priority than the request causing the on-going transmissions. If the transmissions already in progress have a higher priority, the new transmissions start only when the previous transmissions end, with the system remaining in the alert/emergency mode until all pending transactions are completed. If the system is in the polling or the link-monitoring mode, that mode is interrupted only if the priority of the alert/emergency transaction is higher than the priority of the polling or link-monitoring transmissions. If the alert/emergency request priority is lower than the polling or link-monitoring priority, the alert/emergency request is processed only after completion of the higher-priority work.

In the polling mode, the central controller polls at least one of remote units 12 in the message channel 20a, after first sending a transmission on the acknowledgment channel 20b to stop normal mode activity. Replys from the polled remote unit occur on the message channel, and may be followed by further message transactions between the central controller and that remote unit or other remote units. When the central controller has obtained the necessary data or has completed the necessary transactions, the central controller causes the system to exit from the polling mode by sending an appropriate message on the acknowledgment channel.

Link-monitoring mode operates somewhat similarly to the polling mode, and is utilized for checking the quality of the RF link between central controller and one or more remote stations, rather than for actually exchanging information. The link-monitoring mode is entered when the system controller sends a predetermined signal on the acknowledgment channel 20b, causing a requested remote station 12 to send a predetermined bit pattern on the message channel 20a. If the central controller correctly receives the predetermined pattern, insuring correct operation of the message and acknowledgment channels with respect to that remote unit. It should be noted that the request channel can be tested in the same manner, if deemed absolutely necessary, but is not ordinarily done, as testing of the request channel prevents other remote units from using the request channel to transmit their alert/emergency request if they should enter the alert/emergency state.

Figure 3:
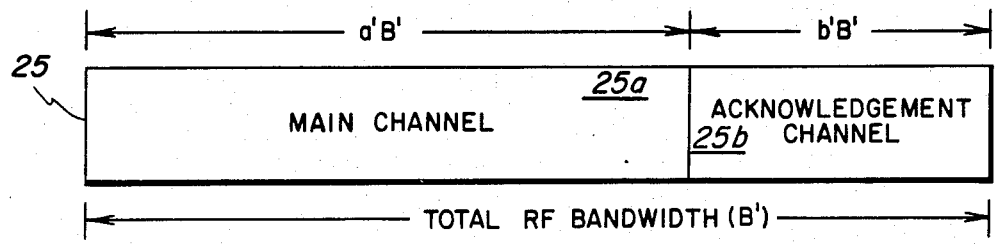
FIG. 3 is a frequency diagram illustrating the partitioning of a single communications channel, in accordance with another method of the present invention.

Referring now to FIG. 3, it is presently preferred to utilize the system with the total RF bandwidth (B') of channel 25 being divided into only two channels: a main channel 25a having a fraction a' of the available bandwidth, or a fractional bandwidth of a'B'; and an acknowledgment channel 25b having the remaining portion b' of the available bandwidth, or a fractional bandwidth of b'B'. By deletion of the request channel, the required total bandwidth B' is less than the bandwidth B required for the same data rate in a system using a message-acknowledgment-request channel structure 20. Similarly, if the original bandwidth B is available, each of the main channel 25a and acknowledgment channel 25b can be expanded to a greater absolute bandwidth, thereby permitting transmission of data at a greater speed. It should be understood that the high-speed main channel 25a utilizes the majority of the system bandwidth, for facilitating message transmission between the remote units and the central controller, while the lower-speed acknowledgement channel 25b is utilized for acknowledging correctly received messages of all types. In this embodiment, the messages sent from remote units 12 to central controller 11 are divided into data packets. The data packet contains, in addition to its message data content, synchronization bits, a header message, and sufficient parity check bits for facilitating "essentially perfect" error detection. Error correction would not be normally utilized with transmissions between the central controller and one or more remote units.

The slave processor in the remote units are formatted to transmit three types of data packets to the central controller: mini-packets, transmitted to indicate unchanged status at the slave processor of a transmitting remote unit and having arrival times generated either randomly or in accordance with some predetermined pattern (and also serving to monitor the condition of the communication links between the remote units and the central controller); status packets transmitted to indicate a status change at the corresponding remote unit and thereby request assistance from the central controller; and request packets which precede status packets and act as a request for main channel transmission space to transmit the soon-to-follow status packet. Advantageously, a request packet is an appropriately formatted version of a mini-packet. The three types of packets are utilized to place the system in one of three states.

Referring now to FIGS. 4, 5 and 6, the message-acknowledgment system states I, II and III are entered, processed and exited in accordance with the state diagram shown. If all remote units 12 do not require attention from the central controller, the system is assumed to be in state I. In state I, as shown by loop 30, each remote unit sends out unchanged/status mini-packets at random, or preassigned periodic intervals, to central controller 11. The mini-packets, each containing d bits, include data bits identifying the transmitting remote location and parity check bits for error detection. Central control 11 does not acknowledge receipt of the state I mini-packets, but does perform an error detection routine upon these mini-packets to monitor RF link quality.

When a remote unit detects a status change (by use of its local sensors), communication with the central controller may be required. The particular remote unit 12 first transmits a request packet 31 (FIG. 5) indicating a change of status to central controller 11. If the changed-status mini-packet 31 is properly received at central controller 11, the central controller responds with an acknowledgment message 33 over the acknowledgment channel and dedicates the main channel to a message transaction between the requesting remote unit and the central controller. Thus, upon properly receiving changed-status information from one or more remote locations the system enters state II, as indicated by state line 32. Upon entering state II and dedicating the main channel to changed-state data transmission, that remote unit issuing the changed-status mini-packet 31 receives the central controller acknowledgment packet 33 on the acknowledgment channel and begins to transact its changed-state information with the central processor. The requesting remote unit thus initially utilizes the main channel to send a status packet 35 (having D bits of information, where D is greater than d). Upon correct reception of packet 35 at the central controller, the controller responds with its own transmission of a D bit packet 37 containing instructions for the remote unit (after an appropriate processing delay 39 in central controller 11). Upon correct reception at the involved remote unit, receipt of the instructions is acknowledged by transmission of an ACK message packet 41 on the acknowledgment channel. Upon receiving the remote unit acknowledgment message 41, the central controller utilizes the acknowledgement channel to transmit a reset message packet 43 to all remote units and thereby return the system, as shown by state-change line 45 (FIG. 4), to the normal state I. In the event that central controller 11 does not respond to a request packet 31 within a prespecified time-out period, the remote unit reschedules its changed-status request message 31 and again attempts to establish communication with the central controller; the system remains in state I until the central controller is actually made aware of the status-change request message packet 31. Similarly, if request packet 31 is correctly received at the central controller and the subsequent status packet 35 is not correctly received, central controller 11 issues a message packet 45 requesting a data retransmission of the status packet from the involved remote unit. The retransmission request packet 48 may be transmitted on either the acknowledgment channel (as shown) or the main channel, while the system remains in state II. Similarly, if the remote unit does not correctly receive the central controller's instructions, the slave processor in the remote unit may ask for a central controller retransmission, as shown by message packet 50 on the acknowledgment channel (although the main channel could also be used). If the central controller does not receive an acknowledgment message packet 41 from the remote unit within a predetermined time-out period, the central controller may, while remaining in state II, automatically retransmit the instructions to the involved remote unit and again wait for an acknowledgment signal. If the central controller still does not receive an acknowledgment, or if there is reason to doubt the integrity of the RF link to a particular remote unit, the central controller may use the acknowledgment channel to request the remote unit to report its status over the main channel, and simultaneously request all other remote units to remain quiet until the indicated remote unit has actually transmitted its status message and the central controller has acknowledged receipt thereof. In the latter case, the system operates along state-change line 52 (FIG. 4) and enters state III. If the requested remote unit does not respond, the central controller may conclude that the RF link is not operational and may request human intervention. Similarly, the system may go to state III if the central controller, on its own initiative, must commence some control action by communication to one or more of the remote units. The acknowledgment channel is utilized to transmit a broadcast packet 54 (FIG. 6) causing communications from all of the remote units to cease. Once state III has been entered, the central controller uses the main channel to communicate necessary commands to one or more remote units, as at 56. Central controller 11 sends a message 58 to all remote units when unreported remote status requests, or other state III transactions, have been completed and the system exits from state III, along line 60 (FIG. 4), to state I. If required, a sequential polling of all remote units can also be initiated by entering state III. It should be understood that if a remote unit has a status packet to send at a time when the system is not in state I, that remote unit reschedules the request packet and again attempts transmission after a random delay. Additional attempts-after-random-delays may be required, until the system returns to state I and is ready for the receipt of a status packet at the central controller.

What is claimed is:

1. A method for random-access data communications from and to a central controller, to and from at least one of a plurality of remote stations, comprising the steps of:
    providing at least one radio-frequency channel having the bandwidth thereof allocated into at a message channel portion and an acknowledgement channel portion;
    transmitting data between at least one of the remote stations and the central controller on the message channel portion;
    acknowledging receipt of data at the central controller by a signal sent on the acknowledgment channel portion to at least the remote station transmitting the data;
    normally operating the system to require each remote station to report unchanged status to the central controller;
    determining, at a particular remote station, that a change of status has occurred;
    requesting use by the particular remote station of the message channel portion to transmit changed-status data to the central controller;
    recognizing an alert state at the central controller responsive to the received changed-status request;
    transmitting from the central controller to the requesting remote station authorization for transmittal of a changed-status message; and
    transmitting the changed-status message to the central controller after receipt of the authorizing message.

2. The method of claim 1, wherein each data transmission includes identification of the remote station either transmitting the data or for which the data is intended.

3. The method of claim 2, wherein each data transmission includes a data parity check portion.

4. The method of claim 1, further comprising the step of: transmitting to at least one of the plurality of remote stations a data message having a predetermined bit pattern; and causing the selected remote station to echo the bit pattern back to the central controller to test the integrity of the radio-frequency channel.

5. The method of claim 1 wherein the remote stations report unchanged status in a predetermined sequence.

6. The method of claim 1, wherein each remote station randomly reports unchanged status.

7. The method of claim 6, wherein the acknowledging step includes the step of: transmitting an acknowledgment message on the acknowledgment channel portion to the reporting remote station after receipt of the unchanged-status message from that remote station.

8. The method of claim 7, further comprising the step of: causing a remote station previously transmitting a normal-mode unchanged status message to the central controller to retransmit that message if an acknowledgment message is not received within a predetermined time interval after the initial unchanged-status message transmission.

9. The method of claim 1, further comprising the step of: providing a request channel portion upon which the request message is transmitted.

10. The method of claim 1, further comprising the step of: preventing transmission of normal, unchanged-status messages after a remote station has been authorized to transmit a changed-status message.

11. The method of claim 1, further comprising the step of: polling each of the plurality of remote stations to report status.

12. The method of claim 1, further comprising the step of: transmitting data as data packets between the central controller and at least one of the plurality of remote stations.

13. The method of claim 12, further comprising the step of: transmitting data indicative of unchanged status at a particular remote station in the form of a mini-packet.

14. A method for random access data communications from and to a central controller, to and from at least one of a plurality of remote stations, comprising the steps of:
    providing at least one radio-frequency channel having the bandwidth thereof allocated into at a message channel portion and an acknowledgment channel portion;
    transmitting data between at least one of the remote stations and the central controller on the message channel portion;
    acknowledging receipt of data at the central controller by a signal sent on the acknowledgment channel portion to at least the remote station transmitting the data;

normally operating the system to require each remote station to randomly report unchanged status to the central controller;

transmitting an acknowledgment message on the acknowledgment channel portion to the reporting remote station after receipt of the unchanged-status message from that remote station; and causing a remote station previously transmitting a normal-mode unchanged-status message to the central controller to retransmit that message if an acknowledgment message is not received within a predetermined time interval after the initial unchanged-status message transmission.

15. The method of claim 14, wherein each data transmission includes identification of the remote station either transmitting the data or for which the data is intended.

16. The method of claim 14, wherein each data transmission includes a data parity check portion.

17. The method of claim 14, further comprising the steps of: determining, at a particular remote station, that a change of status has occurred; providing a request channel portion as part of the at least one radio-frequency channel; requesting, via the request channel, use by the particular remote station of the message channel portion to transmit changed-status data to the central controller; recognizing an alert state at the central controller responsive to the received changed-status request; transmitting from the central controller to the requesting remote station authorization for transmittal of a changed-status message and transmitting the requested-status message to the central controller after receipt of the authorizing message.

18. The method of claim 17, further comprising the step of: preventing transmission of normal, unchanged-status messages after a remote station has been authorized to transmit a changed-status message.

19. The method of claim 14, further comprising the step of: polling each of the plurality of remote stations to report status.

20. The method of claim 14, further comprising the step of: transmitting to at least one of the plurality of remote stations a data message having a predetermined bit pattern; and causing the selected remote station to echo the bit pattern back to the central controller to test the integrity of the radio-frequency channel.

21. The method of claim 14, further comprising the step of: transmitting data as data packets between the central controller and at least one of the plurality of remote stations.

22. The method of claim 21, further comprising the step of: transmitting data indicative of unchanged status at a particular remote station in the form of a mini-packet.

23. A method for random-access data communications from and to a central controller, to and from at least one of a plurality of remote stations, comprising the steps of:

providing at least one radio-frequency channel having the bandwidth thereof allocated into at a message channel portion and an acknowledgment channel portion;

transmitting data between at least one of the remote stations and the central controller on the message channel portion;

acknowledging receipt of data at the central controller by a signal sent on the acknowledgment channel portion of at least the remote station transmitting the data;

normally operating the system to require each remote station to report unchanged status to the central controller;

transmitting to at least one of the plurality of remote stations a data message having a predetermined bit pattern; and causing the selected remote station to echo the bit pattern back to the central controller to test the integrity of the radio-frequency channel.

24. The method of claim 23, wherein each data transmission includes identification of the remote station either transmitting the data or for which the data is intended.

25. The method of claim 24, wherein each data transmission includes a data parity check portion.

26. The method of claim 23, wherein the remote stations report unchanged status in a predetermined sequence.

27. The method of claim 23, wherein each remote station randomly reports unchanged status.

28. The method of claim 27, wherein the acknowledging step includes the step of: transmitting an acknowledgment message on the acknowledgment channel portion to the reporting remote station after receipt of the unchanged-status message from that remote station.

29. The method of claim 28, causing a remote station previously transmitting a normal-mode unchanged-status message to the central controller to retransmit that message if an acknowledgment message is not received within a predetermined time interval after the initial unchanged-status message transmission.

30. The method of claim 28, further comprising the step of: preventing transmission of normal, unchanged-status messages after a remote station has been authorized to transmit a changed-status message.

31. The method of claim 23, further comprising the steps of: determining, at a particular remote station, that a change of status has occurred; providing a request channel portion as part of the at least one radio-frequency channel; requesting, via the request channel, use by the particular remote station of the message channel portion to transmit changed-status data to the central controller; recognizing an alert state at the central controller responsive to the received changed-status request; transmitting from the central controller to the requesting remote station authorization for transmittal of a changed-status message and transmitting the requested-status message to the central controller after receipt of the authorizing message.

32. The method of claim 23, further comprising the step of: polling each of the plurality of remote stations to report status.

33. The method of claim 23, further comprising the step of: transmitting data as data packets between the central controller and at least one of the plurality of remote stations.

34. The method of claim 33, further comprising the step of: transmitting data indicative of unchanged status at a particular remote station in the form of a mini-packet.

* * * * *